US010307938B2

(12) United States Patent
Reber

(10) Patent No.: US 10,307,938 B2
(45) Date of Patent: Jun. 4, 2019

(54) CHEMICAL RESISTANT COMPOSITE SUPPORT PAD MOLD AND METHOD OF MANUFACTURING THE SUPPORT PAD

(71) Applicant: Great Plains Coatings, Inc., Oklahoma City, OK (US)

(72) Inventor: Paul Kirby Reber, Oklahoma City, OK (US)

(*) Notice: Subject to any disclaimer, the term of this patent is extended or adjusted under 35 U.S.C. 154(b) by 414 days.

(21) Appl. No.: 15/288,047

(22) Filed: Oct. 7, 2016

(65) Prior Publication Data

US 2017/0136663 A1 May 18, 2017

Related U.S. Application Data

(60) Provisional application No. 62/256,252, filed on Nov. 17, 2015.

(51) Int. Cl.
| | |
|---|---|
| *B29C 33/46* | (2006.01) |
| *B29C 44/58* | (2006.01) |
| *B29C 44/08* | (2006.01) |
| *B29C 37/00* | (2006.01) |
| *B29K 75/00* | (2006.01) |
| *B29K 105/04* | (2006.01) |

(52) U.S. Cl.
CPC .......... *B29C 33/46* (2013.01); *B29C 37/0032* (2013.01); *B29C 44/08* (2013.01); *B29C 44/581* (2013.01); *B29C 44/58* (2013.01); *B29C 2037/0035* (2013.01); *B29K 2075/00* (2013.01); *B29K 2105/04* (2013.01)

(58) Field of Classification Search
CPC combination set(s) only.
See application file for complete search history.

(56) References Cited

U.S. PATENT DOCUMENTS

| 3,803,274 | A | * | 4/1974 | Nakashima et al. .... B29C 35/10 |
| | | | | 264/201 |
| 3,873,407 | A | * | 3/1975 | Kumata ................ B29C 44/145 |
| | | | | 428/215 |
| 4,201,609 | A | * | 5/1980 | Olsen ................ B29C 66/73715 |
| | | | | 156/182 |
| 4,383,955 | A | * | 5/1983 | Rubio ................ B63B 35/7906 |
| | | | | 249/160 |
| 4,576,855 | A | * | 3/1986 | Okina .................... C08G 18/10 |
| | | | | 428/215 |
| 4,651,893 | A | * | 3/1987 | Mooney ............... B65D 90/501 |
| | | | | 220/560.03 |

(Continued)

*Primary Examiner* — Kevin R Kruer
(74) *Attorney, Agent, or Firm* — Martin S. High, P.C.

(57) ABSTRACT

Embodiments of the mold for making the Chemical Resistant Composite Support Pad are comprised of a top and bottom molds where the top mold is comprised of a mold lip, a pneumatic ejection port, a lid aperture, a magnetic cover for the pneumatic ejection port, and a lid. The method of making a chemical resistant composite support pad comprises the steps of spraying a coating of polymer agent into the top mold and the bottom mold. A controlled run of an agent is sprayed into the joined top and bottom molds along the joint of the top mold and the bottom mold. Polymeric foam is injected through the lid aperture, the lid is replaced, and the foam is allowed to cure. The molds are separated, and compressed air is used to eject the support pad out of the mold. Any irregularities are repaired by spraying the coating of polymer agent.

1 Claim, 8 Drawing Sheets

(56) References Cited

U.S. PATENT DOCUMENTS

| | | | | |
|---|---|---|---|---|
| 4,987,666 A * | 1/1991 | Smith | ............... | A47C 7/18 264/45.1 |
| 5,116,557 A * | 5/1992 | Debaes | ............... | B29C 37/0032 264/245 |
| 5,240,528 A * | 8/1993 | Pagni | ............... | A47B 13/00 156/63 |
| 5,744,077 A * | 4/1998 | Grisch | ............... | B29C 44/1233 264/161 |
| 5,853,649 A * | 12/1998 | Tisack | ............... | A43B 9/12 264/446 |
| 5,938,993 A * | 8/1999 | Greene | ............... | B29C 44/0461 264/255 |
| 6,030,560 A * | 2/2000 | Bortz, Jr. | ............... | B29C 44/1238 264/155 |
| 6,069,319 A * | 5/2000 | Davis, Jr. | ............... | B29C 44/12 174/110 F |
| 6,129,870 A * | 10/2000 | Hettinga | ............... | B29C 44/0407 264/40.5 |
| 6,245,264 B1 * | 6/2001 | Krause | ............... | B29C 39/025 264/46.4 |
| 6,294,248 B1 * | 9/2001 | Madan | ............... | B29C 44/14 264/255 |
| 6,432,543 B2 | 8/2002 | Harrison | ............... | B29C 44/146 428/423.1 |
| 6,841,111 B2 * | 1/2005 | Rickner | ............... | B29C 41/003 264/250 |
| 6,849,218 B1 * | 2/2005 | De Winter | ............... | B29C 37/0032 264/240 |
| 7,147,809 B2 * | 12/2006 | Cowelchuk | ............... | B29C 44/1257 264/46.5 |
| 7,284,784 B2 * | 10/2007 | Cowelchuk | ............... | B29C 45/1628 264/328.8 |
| 7,600,652 B1 * | 10/2009 | Johansen | ............... | B29C 66/7234 220/582 |
| 7,875,224 B2 * | 1/2011 | Gruber | ............... | B29C 37/0032 264/248 |
| 9,242,398 B2 * | 1/2016 | Sosa Bravo | ............... | B29C 44/18 |
| 2005/0110181 A1 * | 5/2005 | Ingwersen | ............... | B29C 44/145 264/46.5 |
| 2005/0133959 A1 * | 6/2005 | Sroka | ............... | B29C 33/30 264/245 |
| 2006/0165947 A1 * | 7/2006 | Kellogg | ............... | B29C 67/246 428/71 |
| 2007/0148411 A1 * | 6/2007 | Yamada | ............... | B29C 44/0461 428/172 |
| 2008/0111266 A1 * | 5/2008 | Park | ............... | B29C 44/06 264/45.6 |
| 2008/0280120 A1 * | 11/2008 | Fechner | ............... | E04B 1/803 428/304.4 |
| 2009/0183455 A1 * | 7/2009 | Polk, Jr. | ............... | B32B 3/12 52/309.1 |
| 2009/0243159 A1 * | 10/2009 | Sun | ............... | B29C 71/02 264/494 |
| 2009/0261494 A1 * | 10/2009 | Winget | ............... | B29C 44/086 264/39 |
| 2010/0028609 A1 * | 2/2010 | Sato | ............... | B29C 44/0407 428/159 |
| 2010/0209293 A1 * | 8/2010 | Ikawa | ............... | A23L 3/26 422/22 |
| 2012/0136400 A1 * | 5/2012 | Julien | ............... | A61F 2/28 606/86 R |
| 2012/0282424 A1 * | 11/2012 | Tabeya | ............... | B29C 45/1657 428/60 |
| 2013/0136931 A1 * | 5/2013 | James | ............... | B29C 67/246 428/423.1 |
| 2014/0147605 A1 * | 5/2014 | Bieniek | ............... | B29C 45/14467 428/35.7 |
| 2014/0210233 A1 * | 7/2014 | Brymerski | ............... | B60J 5/0415 296/191 |
| 2015/0328830 A1 * | 11/2015 | Ferguson | ............... | B32B 7/04 264/46.5 |
| 2015/0352816 A1 * | 12/2015 | Wang | ............... | B29C 45/14795 428/319.3 |
| 2015/0375460 A1 * | 12/2015 | Tadepalli | ............... | C08G 69/08 264/45.3 |
| 2016/0052230 A1 * | 2/2016 | Filipp | ............... | B29C 44/146 428/172 |
| 2017/0051121 A1 * | 2/2017 | Prissok | ............... | C08J 9/228 |
| 2017/0136663 A1 * | 5/2017 | Reber | ............... | B29C 37/0032 |
| 2018/0036916 A1 * | 2/2018 | Pettey | ............... | B29C 33/3842 |

* cited by examiner

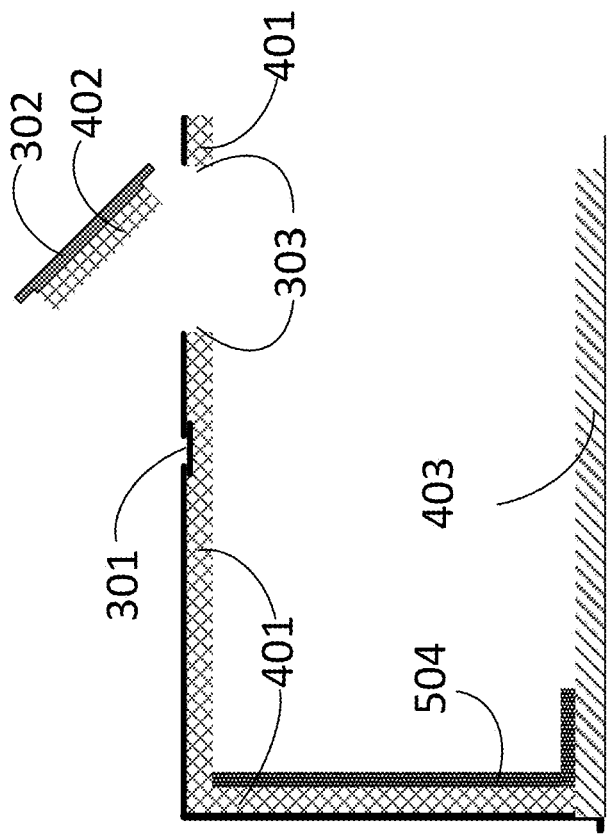
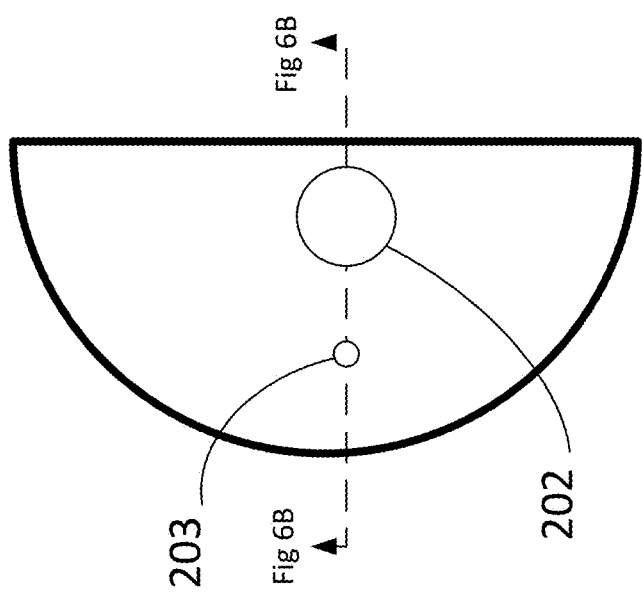
FIG 6B
FIG 6A

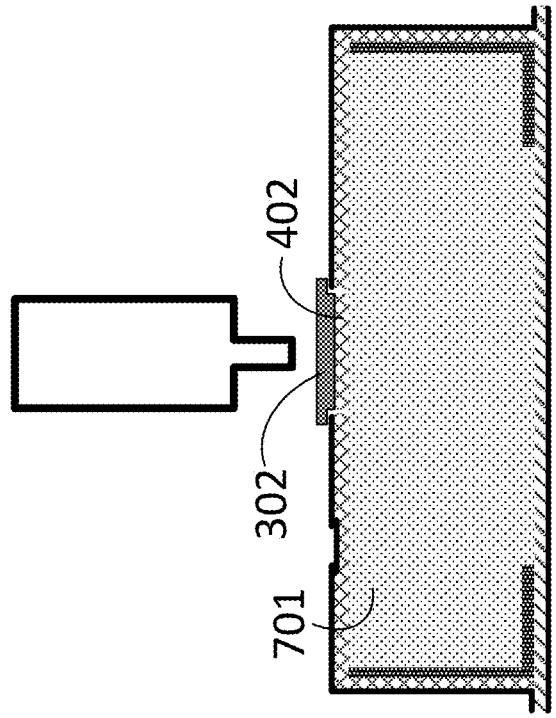
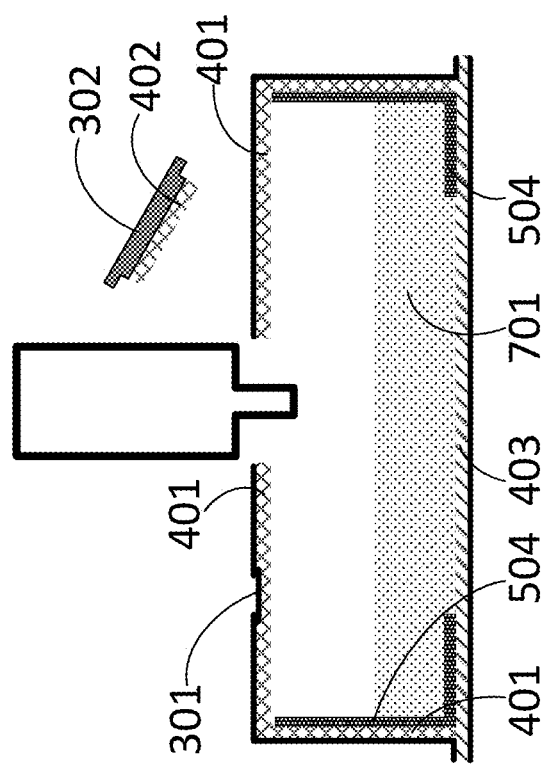
FIG 7A
FIG 7B

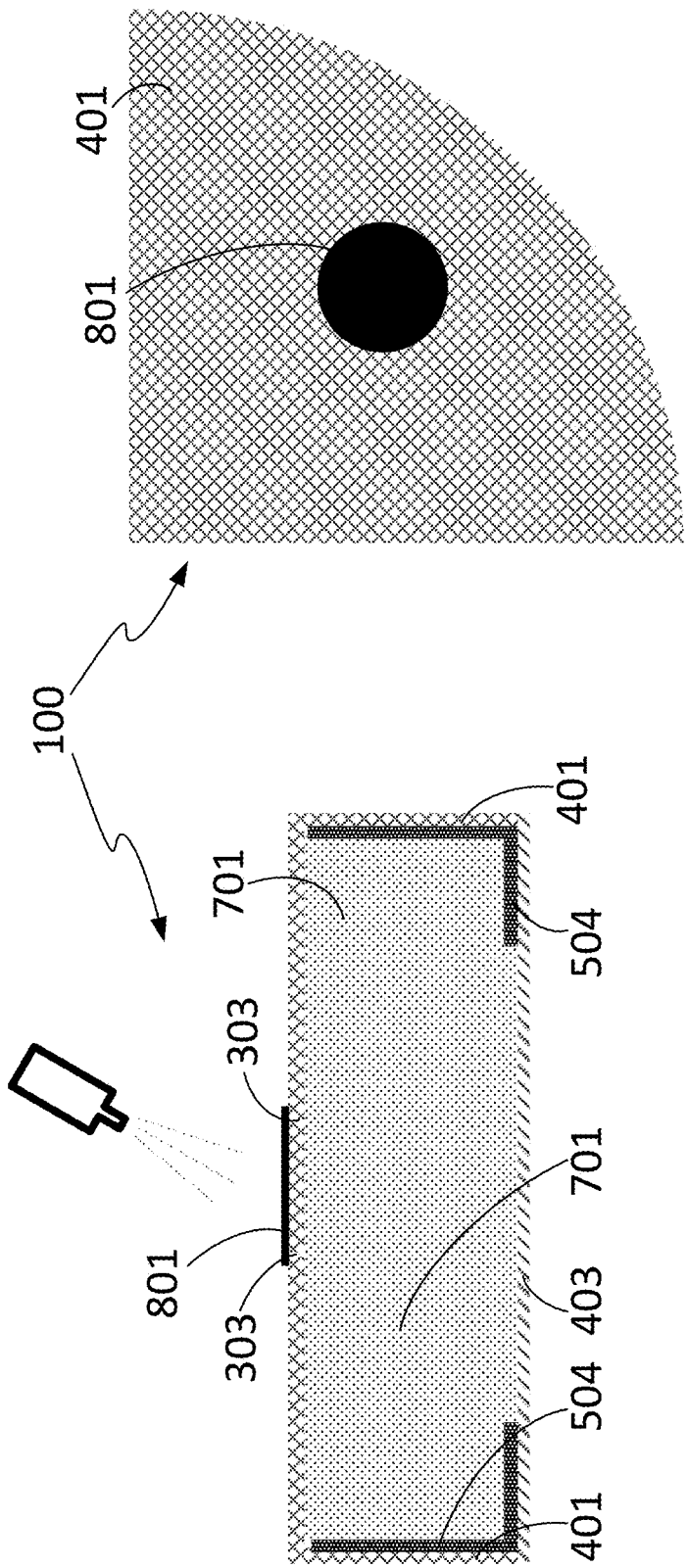

CHEMICAL RESISTANT COMPOSITE SUPPORT PAD MOLD AND METHOD OF MANUFACTURING THE SUPPORT PAD

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE EMBODIMENTS

Field of the Embodiments

The field of the embodiments of the Chemical Resistant Composite Support Pad is generally tank support equipment and as an example, without limiting the application of the embodiments, oil field tank support pads.

Description of Prior Art

The prior art encompasses a variety of support structures including wood beams and other commonly found support means. These types of structures are inherently flawed as they typically degrade in the environment. Other support structures include coated polystyrene foam. Unfortunately, polystyrene foam suffers from degradation by the material present in the tanks being supported. In addition, defects form in the solid surface when a pre-formed foam core is covered with a sprayed-on solid coating. The purpose of the embodiments presented herein are to address these deficiencies.

SUMMARY OF THE EMBODIMENTS

Embodiments of the Chemical Resistant Composite Support Pad (hereinafter the "Support Pad") are comprised of both the process and devices to manufacture the Support Pad. The devices used to manufacture the Support Pad are comprised of a top mold and a bottom mold. Both the process and devices to manufacture the Support Pad can form support pads of various sizes and geometries. The support pads can be manufactured in various shapes to accommodate larger tanks such as sectional circles or pie shaped supports for tanks. Many shapes or geometries may be formed. And, the various geometries can be segmented in various ways. The variety of shapes and the segmentation is important to be able to mold tanks supports in various and enlarged geometries but yet allow the tanks supports to be easily transported.

The Support Pads and method of manufacturing the Support Pads comprise several advantages over the prior art. First, the Support Pads are manufactured with a solid coating that completely envelops the center foam core. Since the Support Pads including the solid coating are cast in a mold, no defects are found like the defects found on prior art devices with a sprayed on coating. The Support Pads can be manufactured to a variety of shapes and sizes to form support pads for essentially unlimited sizes and shapes of tanks. In addition, the segmentation of the Support Pads allows for easy transport and assembly at the job site.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable relevant patent granting authorities and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

BRIEF DESCRIPTION OF THE DRAWINGS

FIG. 6A is a top view of an embodiment of the Chemical Resistant Composite Support Pad mold in a half circle configuration; FIG. 6B is a sectional view of an embodiment of the Chemical Resistant Composite Support Pad mold.

FIG. 7A is a sectional view of an embodiment showing the mold being filled with polyurethane foam; FIG. 7B shows an embodiment showing the mold of the Chemical Resistant Composite Support Pad completely filled with polyurethane foam.

FIG. 8A shows a sectional view of embodiment of the Chemical Resistant Composite Support Pad with the mold removed in the area of the lid being finished with additional spray; FIG. 8B shows a top view of an embodiment of a quarter circle of the Chemical Resistant Composites Support Pad showing the finish to the lid area.

DETAILED DESCRIPTION OF THE PREFERRED EMBODIMENTS

Figure 1A:
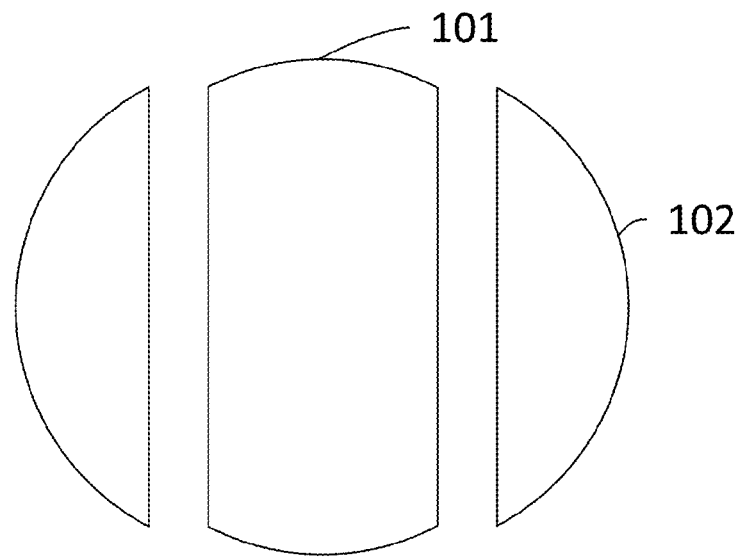
FIG. 1A is a top view of a segmented embodiment of the Chemical Resistant Composite Support Pad.
Figure 1B:
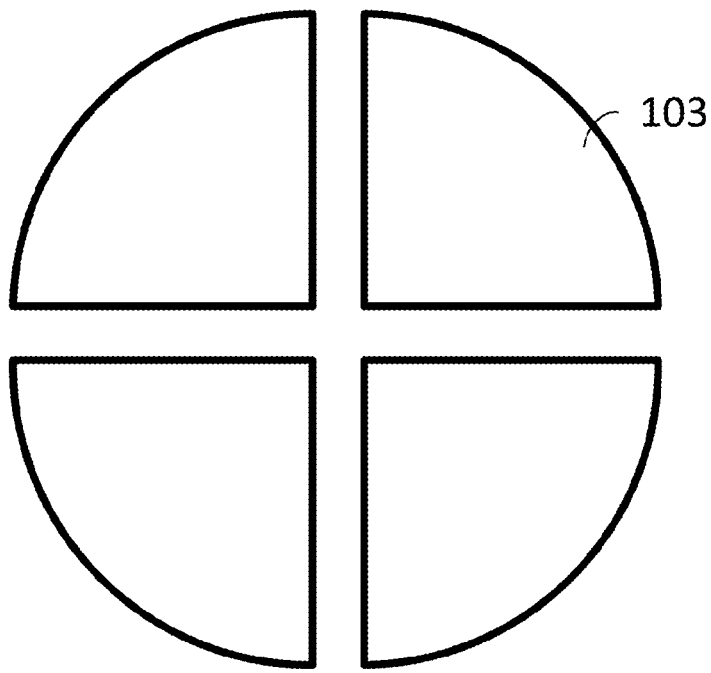
FIG. 1B is a top view of a pie shaped embodiment of the Chemical Resistant Composite Support Pad.
Figure 2:
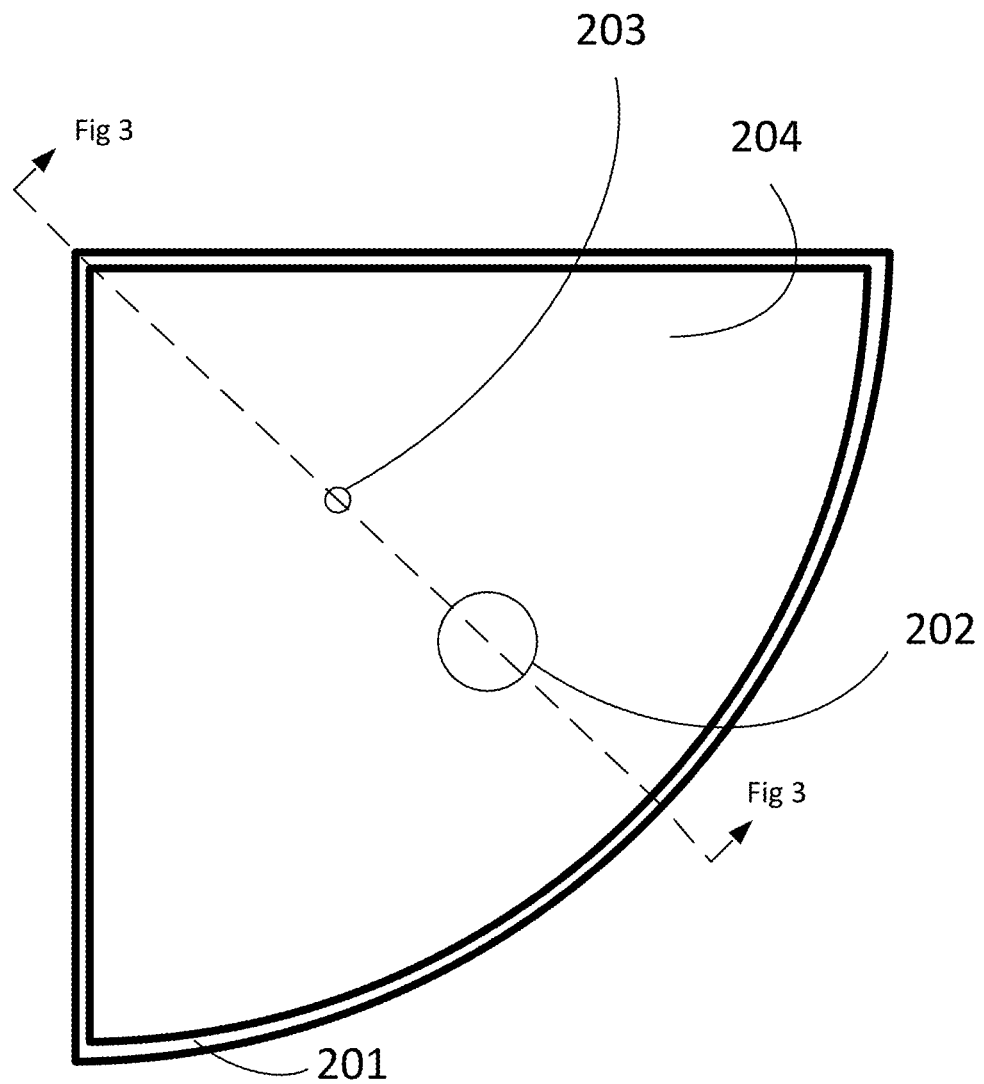
FIG. 2 is a top view of an embodiment of the Chemical Resistant Composite Support Pad mold.
Figure 3:
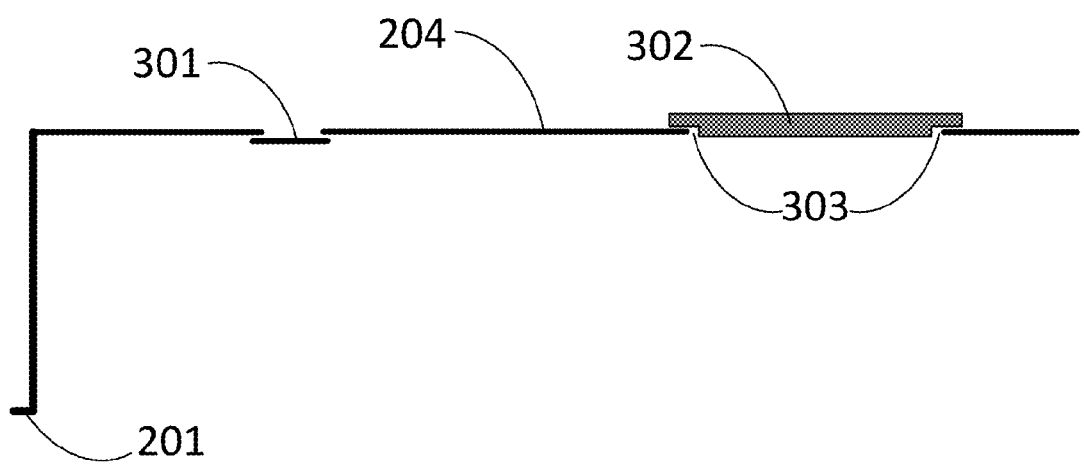
FIG. 3 is a cross-sectional view of the top mold that forms embodiments of the Chemical Resistant Composite Support Pad.

Embodiments of the Chemical Resistant Composite Support Pad 100 (hereinafter the "Support Pad") are comprised of both the process and devices to manufacture the Support Pad 100. The devices used to manufacture the Support Pad 100 are comprised of a top mold 204 and a bottom mold 404. Both the process and devices to manufacture the Support Pad 100 can form support pads of various sizes and geometries. For example as shown in FIGS. 1A and 1B, support pads can be manufactured in various shapes to accommodate larger tanks such as sectional circles, 101, 102, as shown in FIG. 1A or pie shaped supports 103 for tanks. These examples are not limiting as many shapes may be formed including square, rectangular, circular, oblong, elliptical and polygon. In addition, the size of tanks to be supported by the tank support is not limited in any way. The most common diameter of tanks is 12' and 15'6".

These various geometries can be segmented in various ways. The variety of shapes and the segmentation is important to be able to mold tanks supports in various and enlarged geometries but yet allow the tanks supports to be transported.

The top mold 204 is comprised of a mold lip 201, a pneumatic ejection port 203, a lid aperture 202, a magnetic cover 301 for the pneumatic ejection port 203, and a lid 302. The magnetic cover 301 covers the pneumatic ejection port 203 during the spraying of the coatings inside of the mold as well as the injection of the polymer foam. The mold lip 201 is used to seal the top mold 204 to the bottom mold 404 in particular to seal the mated bottom mold 404 and top mold 204 when the controlled run is made to complete the inside coating.

The magnetic cover 301 is a thin sheet of magnetic material that is placed over the pneumatic ejection port 203 on the inside of the top mold 204. The pneumatic ejection port 203 is used when the Support Pad 100 is to be ejected from the mold by inserting compressed air into the pneumatic ejection port 203 to force the Support Pad 100 out from the mold. The magnetic cover 301 is easily detached from the top mold by the force of the compressed air inserted in the pneumatic ejection port 203.

The lid 302 covers the lid aperture 202 during the spraying of the skin coating and is removed to allow access the interior of the mold when the controlled run is performed and when the foam is added to the inside of the mold. A small gap 303 is formed between the lid 302 and the top mold 204 when the lid 302 is positioned. The small gap 303 allows for the removal of the lid 302 at the conclusion of the molding process.

Figure 4A:
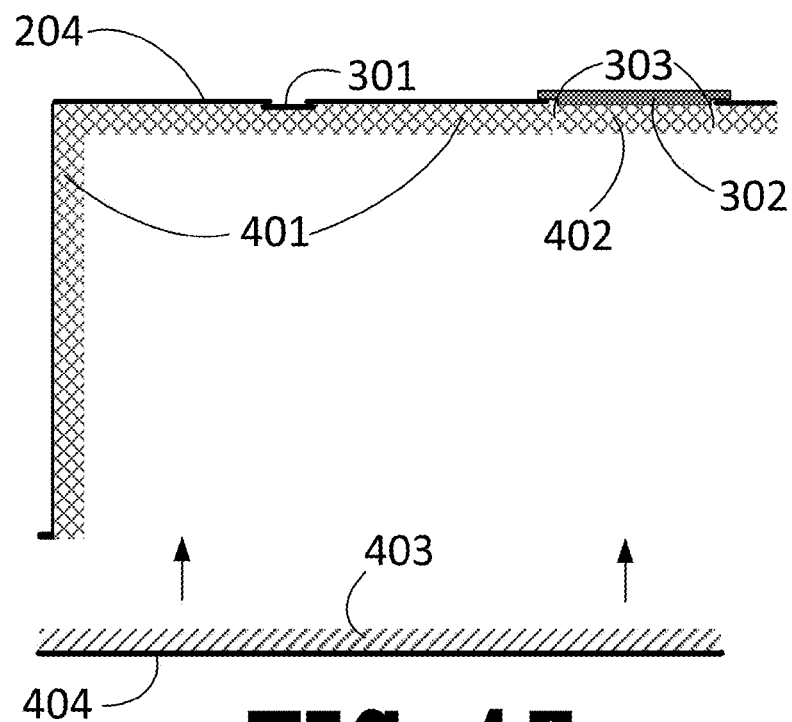
FIG. 4A is a sectional view showing the coating of the top mold, the coating of the bottom mold, and showing in schematic the meeting of the top mold in the bottom mold.
Figure 4B:
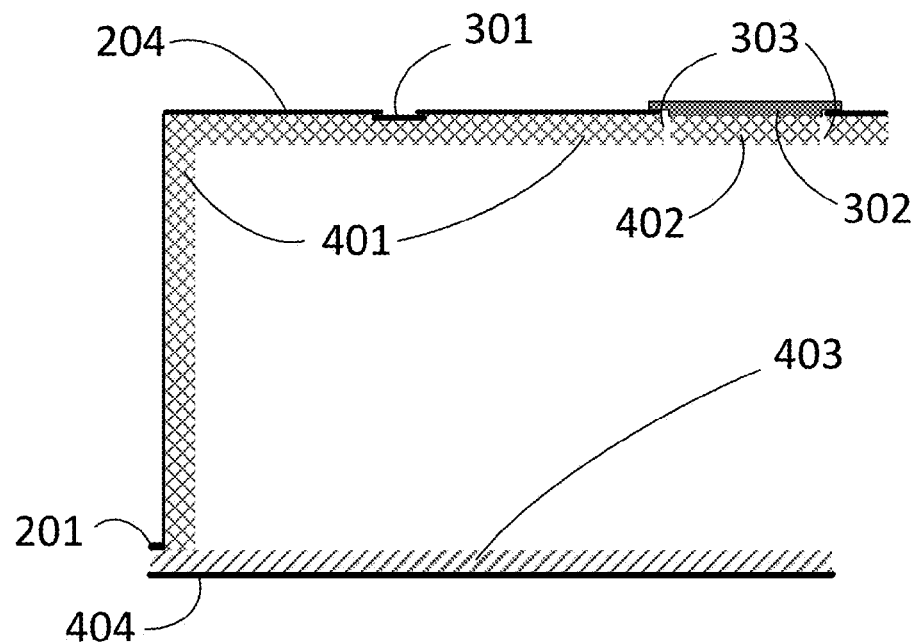
FIG. 4B is a sectional view of the top mold and the bottom mold in the mated position.
Figure 5:
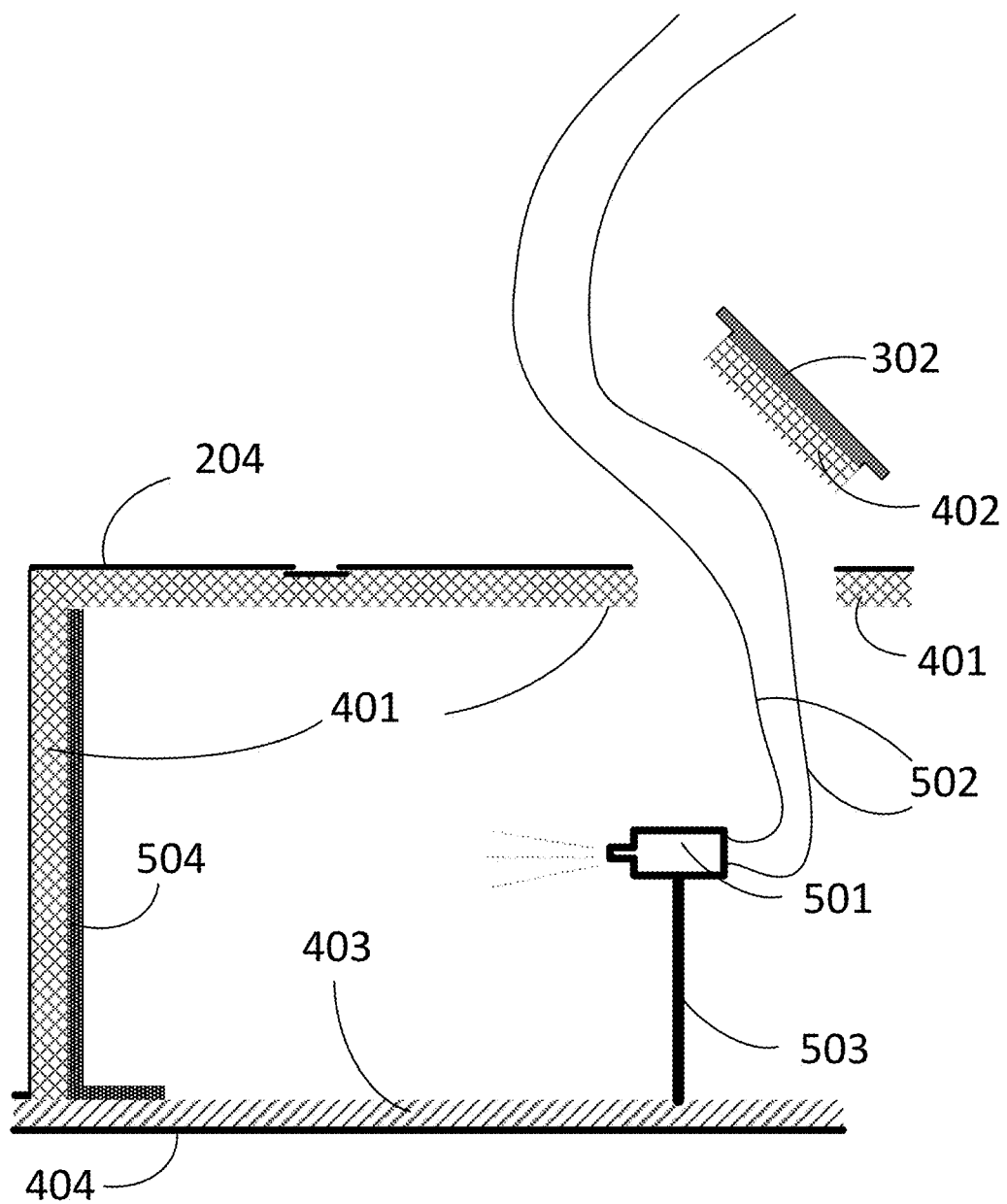
FIG. 5 is a sectional view of the mated top and bottom mold showing the controlled run being installed.

The process of forming a Support Pad 100 is comprised of the following steps. First, the top mold 204 and the bottom mold 404 are opened so that the interior sides of both molds are accessible. Then a coating of polymer agent is sprayed onto the interior sides of the top mold 204 and the bottom mold 404 to create a top mold coating 401 and a bottom mold coating 403. A polymer agent is any polymeric material that may be applied through a spraying technique. In one embodiment of the forming the Support Pad 100, the polymer agent is either polyurea or polyurethane. Then the two molds are allowed to cure. After a proper curing time, the two molds are placed together as shown schematically in FIG. 4B. However, the molds when they are placed together may have areas at the intersection of the top mold coating 401 and the bottom mold coating 403 that are not sealed properly. The lid 302 is removed along with a portion of the coating 402. To completely seal any remaining exposed joints at the intersection of the top mold coating 401 and the bottom mold coating 403, a controlled run of a controlled run 504 of the same polymer coating used in the top mold coating 401 and the bottom mold coating 403 is used. The controlled run 504 is sprayed over top mold coating 401 and along the joint of the top mold coating 401 and the bottom mold coating 403. The interior of the mold is access via the aperture formed when the lid 302 is removed. The spray gun 501 is placed on a support 503 in the interior of the mated molds. The hosing 502 supplying the controlled run agent 504 precursor are fed through the lid aperture 202. The controlled run agent 504 seals the remaining joint when the top mold 204 is mated with the bottom mold 404. After the controlled run agent 504 cures, the spray gun 501 and spray gun support 503 is removed. Next, polymeric foam 701 is injected through the lid aperture 202. Polymer foam 701 is injected into the mated molds in an amount to sufficiently fill the cavity. See FIGS. 7A and 7B. Polymer foam is any polymer agent that forms a foam structure when cured. In one embodiment of the Support Pad 100 the polymeric foam is polyurethane. Next the lid 302 is replaced onto the top mold then the foam is allowed to rise and harden. Then the top mold 204 and bottom mold 404 are segregated. Compressed air is forced into the pneumatic ejection port 203 forcing the magnetic cover 301 and the Support Pad 100 out of the top mold. The magnetic cover 301 is removed. Any irregularities in the areas of the Support Pad 100 covered by the lid 302 or the magnetic cover 301 are repaired by spraying the coating of polymer agent that was sprayed onto the interior sides of the top mold 204 and the bottom mold 404 onto the irregularities 801. See FIG. 8A. Once any irregularities 801 are repaired, the Support Pad 100 is completed. See FIG. 8B.

What I claim is:
1. A method of making a chemical resistant composite support pad comprising the steps
 a) a top mold and a bottom mold are opened so that the interior sides of both molds are accessible; wherein the top mold comprises a pneumatic ejection port, a magnetic cover for the pneumatic ejection port, a lid aperture, and a lid covering the lid aperture;
 b) a coating of a polymer agent is sprayed onto the interior sides of the top mold to form a top mold coating and the bottom mold to form a bottom mold coating and then the top and bottom coatings are allowed to cure;
 c) the top mold and a bottom molds are placed together, and the lid located on the top of the top mold is removed along with a portion of the coating;
 d) the polymer agent used in the top mold coating and the bottom mold coating is sprayed into the interior of the closed coated molds via the lid aperture to completely seal any remaining exposed joints at the intersection of the top mold coating and the bottom mold coating and the polymer agent is allowed to cure;
 e) polymeric foam is injected through the lid aperture;
 f) the lid is placed over the lid aperture;
 g) the foam is allowed to rise, harden, and cure;
 h) the top mold and the bottom mold are separated;
 i) compressed air is forced into the pneumatic ejection port forcing the magnetic cover and the support pad out of the top mold;
 and j) irregularities in the areas covered by the lid or the magnetic cover are repaired by spraying another coating of the polymer agent.

\* \* \* \* \*